US009471984B2

(12) United States Patent
Zuest et al.

(10) Patent No.: US 9,471,984 B2
(45) Date of Patent: Oct. 18, 2016

(54) METHOD FOR SELF-CALIBRATION OF A MICROSCOPE APPARATUS

(71) Applicant: Leica Microsystems (Schweiz) AG, Heerbrugg (CH)

(72) Inventors: Reto Zuest, Diepoldsau (CH); Meinrad Berchtel, Schnifis (AT)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 246 days.

(21) Appl. No.: 14/132,086

(22) Filed: Dec. 18, 2013

(65) Prior Publication Data

US 2014/0169637 A1    Jun. 19, 2014

(30) Foreign Application Priority Data

Dec. 19, 2012   (DE) .......................... 10 2012 223 763

(51) Int. Cl.
| | |
|---|---|
| G06T 7/00 | (2006.01) |
| G01B 9/04 | (2006.01) |
| G01B 11/02 | (2006.01) |
| G01B 11/14 | (2006.01) |
| G02B 21/36 | (2006.01) |
| G02B 21/02 | (2006.01) |

(52) U.S. Cl.
CPC ............... *G06T 7/0044* (2013.01); *G01B 9/04* (2013.01); *G01B 11/02* (2013.01); *G01B 11/14* (2013.01); *G02B 21/025* (2013.01); *G02B 21/365* (2013.01)

(58) Field of Classification Search
None
See application file for complete search history.

(56) References Cited

U.S. PATENT DOCUMENTS

| | | | |
|---|---|---|---|
| 5,389,774 A | 2/1995 | Gelman et al. | |
| 2004/0004762 A1* | 1/2004 | Bruehl | G01B 9/04 |
| | | | 359/462 |

(Continued)

FOREIGN PATENT DOCUMENTS

| | | |
|---|---|---|
| DE | 10225193 A1 | 1/2004 |
| DE | 10242628 A1 | 3/2004 |

(Continued)

OTHER PUBLICATIONS

Edelstein, Arthur, et al. "Computer control of microscopes using μManager." Current protocols in molecular biology (2010): 14-20.*
Sun, Zili, Jed S. Lyons, and Stephen R. McNeill. "Measuring microscopic deformations with digital image correlation." Optics and Lasers in Engineering 27.4 (1997): 409-428.*

*Primary Examiner* — Vikkram Bali
*Assistant Examiner* — Tracy Mangialaschi
(74) *Attorney, Agent, or Firm* — Hodgson Russ LLP

(57) ABSTRACT

A method for calibrating a microscope apparatus (1) having a variable optical magnification system (13) and a detector device (12) is disclosed. First, a calibrating mode is performed, wherein an image (50) of an object (10) is captured at a known reference magnification value, two characteristic reference points (32a, 32b) are determined in the image, a reference distance (34) between the two reference points is determined, and a correlation is determined between the reference distance and the reference magnification value. Later, a measuring mode is implemented, in which a current image (51) of the object (10) is captured at a second magnification value, the two characteristic reference points (52a, 52b) are identified therein, a current distance (54) between the current reference points is determined, and the second magnification value is determined from the current distance (54) based on the correlation between the reference distance (34) and the reference magnification value.

14 Claims, 6 Drawing Sheets

(56) References Cited

U.S. PATENT DOCUMENTS

Figure 1:
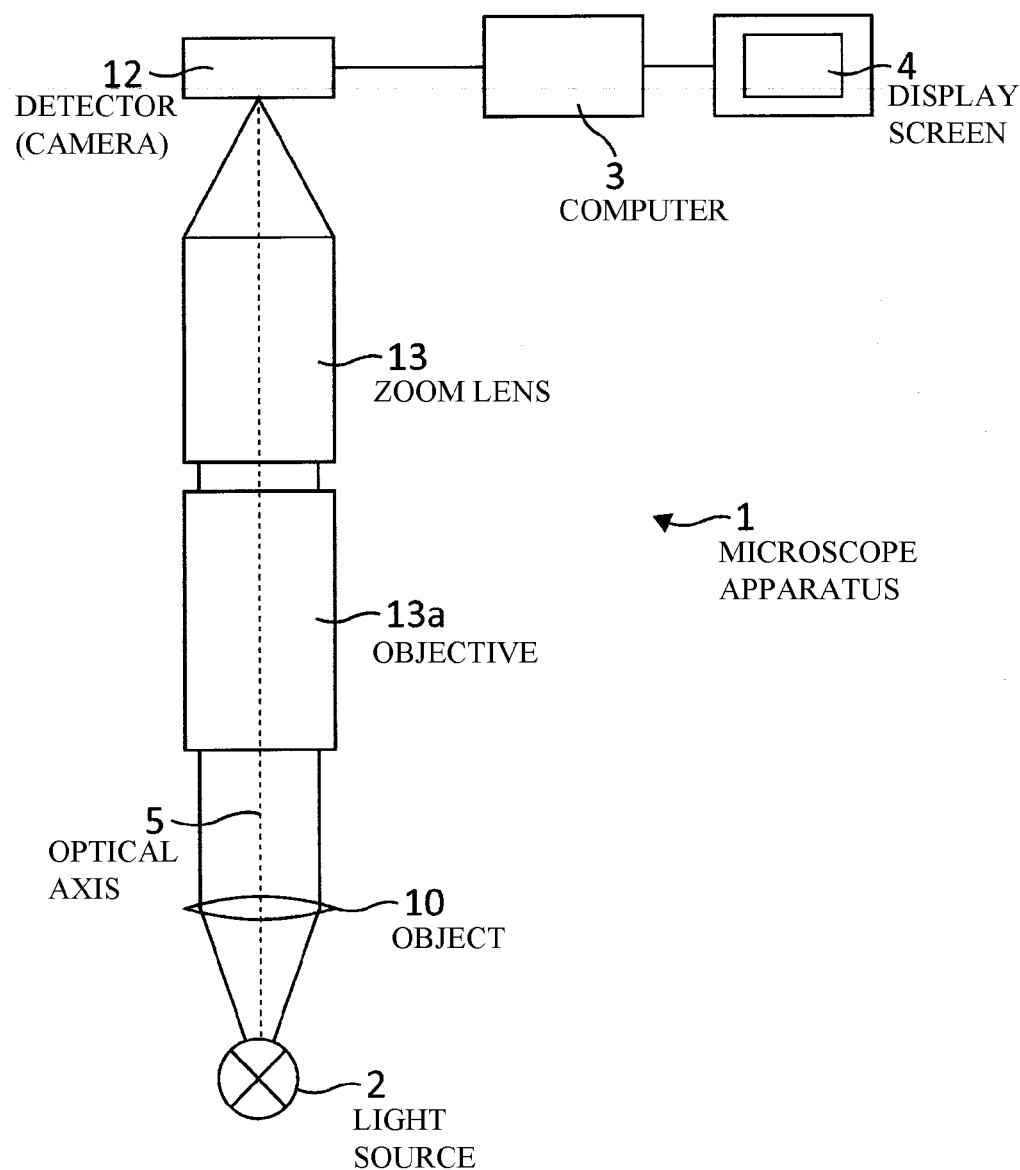

2005/0157953 A1* 7/2005 Ney .................. G01B 11/00
382/312
2005/0220362 A1 10/2005 Nikitin
2007/0211243 A1 9/2007 Laroche et al.

FOREIGN PATENT DOCUMENTS

| DE | 102008014030 A1 | 9/2009 |
| DE | 102008000879 A1 | 10/2009 |
| DE | 102009054703 A1 | 6/2011 |

* cited by examiner

METHOD FOR SELF-CALIBRATION OF A MICROSCOPE APPARATUS

CROSS REFERENCE TO RELATED APPLICATIONS

This application claims priority of German patent application number 10 2012 223 763.1 filed Dec. 19, 2012, the entire disclosure of which is incorporated by reference herein.

FIELD OF THE INVENTION

The present invention relates to methods for self-calibration of a microscope apparatus.

BACKGROUND OF THE INVENTION

In microscope apparatus with optical magnification systems, the magnification value of the magnification system can usually be freely smoothly adjusted. For many kinds of evaluations of images recorded at a particular magnification value, it is essential to know this magnification value. For example, the actual size of the object can be determined from the image of an object by means of the magnification value currently selected.

Coded microscope apparatus comprise means that electronically determine the magnification value currently selected. This can be done, for example, with an electric sensor. The microscope apparatus can also be fitted with an electric motor that adjusts the magnification. The magnification value currently selected can be indicated directly by the motor.

Many simpler microscope apparatus are not coded, however, and have no means for determining the magnification value currently selected. The magnification value therefore has to be determined manually by the user himself. For example, the user can read the value off a printed scale of magnifications.

It is also possible, as described in DE 10 2009 054 703 A1, to determine the magnification value by moving the microscope stage on which the specimen is located by a known predefined distance and evaluating the associated shifts in the images.

US 2005/0220362 describes a calibration in which a diffraction lattice is used, wherein the lattice constant or the spacings of the individual columns in the lattice are known. A magnified image of the lattice is obtained using a microscope and the spacings of the columns in this lattice are determined. The magnification value is determined using the ratio of the lattice constant to these gaps determined in the image of the lattice.

These methods of manually determining the magnification value are very complicated, laborious and time-consuming for a user. In addition, these methods all have a capacity for human error. The possibility of misreading a marking or making an error in the evaluation cannot be ruled out.

The evaluations of the images with the magnification values found also have an extremely limited reproducibility, as it is very difficult to reset the corresponding magnification value exactly with the necessary precision and accuracy at a later time.

If for example the images are evaluated automatically using software, the user generally first has to input the magnification value determined into the software. This is another possible source of human error. For example, if a series of images are taken with different magnification values, the user may input an incorrect magnification value into the software for one of the images or may forget to enter a magnification value. In this case he might, in some cases, have to repeat the entire series of images.

If an additional device is needed for manually determining the magnification value, for example a microscope stage as mentioned previously, the movement of which has to be precisely known, or a diffraction lattice with a precisely known lattice constant, this has substantial cost implications.

It is therefore desirable to provide an opportunity, for microscope apparatus with optical magnification systems, of determining the magnification value currently selected for the optical magnification system in a simple, precise and reproducible manner.

SUMMARY OF THE INVENTION

According to the invention a method for self-calibration of a microscope apparatus is proposed. Advantageous features will become apparent from the description that follows.

For a method according to the invention for self-calibration of a microscope apparatus the corresponding microscope apparatus comprises an optical magnification system and a detection device. The detection device records images of an object to be observed with different degrees of magnification of the optical magnification system.

The microscope apparatus may comprise for example a stereomicroscope, an optical microscope or a macroscope. The microscope images the object in focused manner on the detector unit. The detector unit may be embodied for example as a CCD camera or as a CMOS camera. The size of the object in the image of the detector unit is determined by the degree of magnification of the magnification system, which allows variable magnification. The magnification system may be embodied for example as a zoom lens, a lens changer or a magnification changer.

Before the microscope apparatus is operated in a measuring mode, in which the object is imaged with an unknown degree of magnification, at a second later point in time, and this unknown degree of magnification has to be determined, the microscope apparatus is first of all operated in calibrating mode at a first point in time. The first point in time occurs before the second point in time. Advantageously, in the measuring mode, a geometric size of the object can be determined by means of this specific magnification value.

In the calibrating mode, an image of the focused object is recorded with the detector at a known reference value of the magnification of the optical magnification system. At least two characteristic reference points are determined in the image, preferably automatically without any input from a user.

For this purpose, a high-contrast and clearly identifiable reference feature of the imaged object is determined, for example, for each characteristic reference point. The reference features should be as individual and easily identifiable as possible in form, differing as sharply as possible from a harmonic geometric shape such as a circle, an ellipse or a square. The reference features should also differ sharply from the surrounding background in their brightness, contrast and/or colour.

A point that clearly characterises the particular reference feature is determined as the characteristic reference point.

For example, a centre of area or a geometric centre of the reference feature can be determined as a characteristic reference point.

A distance, particularly in pixels, between the at least two characteristic reference points in the image is determined as a reference distance. If, for example, precisely two reference points are determined, the direct distance of the two reference points from one another can be determined as the reference distance. If more than two reference points are determined, the direct distances between each two reference points can be determined, for example. The mean value or the sum of the individual distances can be determined as the reference distance, for example.

A correlation, for example a quotient, is determined between the reference distance determined and the known reference magnification value.

At a second, later point in time, the microscope apparatus is operated in measuring mode. A current image of the object is captured with the detector at an unknown second magnification value of the optical magnification system.

The reference features determined in the calibrating mode and the associated characteristic reference points are automatically identified in the current image. For identifying the reference features or the reference points, methods of image analysis may be used, for example, such as an image comparison or a feature extractor. From the identified reference points in the current image, a current distance between the reference points in the current image is determined, analogously to the reference distance in the calibrating mode.

The second magnification value is determined from the current distance on the basis of the correlation between the reference distance and the reference magnification value.

ADVANTAGES OF THE INVENTION

The method according to the invention may be carried out in particular in the form of a software, autonomously and independently, without any input by a user. The current magnification value can thus be determined automatically, reliably and precisely. The method according to the invention runs parallel to the observation of the object in real time and does not take up any additional time. If the current magnification value were to be needed for evaluation using a second programme, the software is able to inform this programme automatically of the current magnification value determined.

In the measuring mode, an image can be captured continuously by means of the detector unit. The software permanently searches each image for the characteristic reference features determined in the calibrating mode and permanently determines the current magnification value. The magnification value determined can be indicated to the user for example by means of a user interface of the software. If the user manually adjusts the magnification value of the magnification system, the user can read off the newly set magnification value immediately with no delay or waiting time. To do this, the user does not have to carry out any complicated time-consuming calculations or evaluations; the user is automatically instantly informed of the newly selected magnification value in real time.

Reading errors, miscalculations or other sources of error in manually determining the magnification value are thus excluded. Moreover, the determination of the magnification value according to the invention and the associated imaging of the object are reproducible. If, for example, at an even later point in time, a user wishes to examine a new object with the second magnification value of the second point in time and for this reason has to reset the second magnification value precisely, the user first of all implements the calibrating mode once again on the new object. In this way, new characteristic reference points and a new reference distance are determined for the new object. Then the user implements the measuring mode again and adjusts the magnification until, using the method according to the invention with the aid of the new characteristic reference points and the new reference distance, the second magnification value at which the new object is to be examined is determined once again as the current magnification value.

Particularly advantageously, the actual size of the object can be determined. The size of the object can be determined already in the calibrating mode or in the measuring mode.

Preferably, an area, a length, a width, a circumference or other geometric feature of the object can be determined as the size of the object. It is also possible to determine only the size of a partial region of the object or the size of the reference features. For example, the user may mark a region of the object by means of the user interface. The size of this marked region can then be determined. The marking may be for example a line, a straight line, a rectangle, a circle or an area that is freely definable by the user, e.g. a polygon or a freehand area.

Preferably, a pixel size on the object side is determined. The pixel size on the object side is generally a quotient of the size of an image point of the detector unit and the magnification value currently selected. In the case of a CCD camera or a CMOS camera, the size of an image point may be the pixel size of the CCD chip or the CMOS sensor. In the calibrating mode, the object-side pixel size is determined as the quotient of the reference magnification value and the pixel size of the detector unit. In the measuring mode, the object-side pixel size is determined as the quotient of the second magnification value and the pixel size of the detector unit.

The object-side pixel size indicates the actual size of a feature of the object that precisely fills a pixel in the image. In microscopic apparatus with a variable magnification value the object-side pixel size varies with the particular magnification value selected. In the calibrating mode the object-side pixel size can be determined as the reference pixel size.

Advantageously, the actual size of the object can be determined from the object-side pixel size determined. For this, the number of pixels covered by the object in the actual image is determined. The actual size of the object is obtained by multiplying the object-side pixel size with this number of covered pixels. The object-side pixel size must be determined with the magnification value with which the image was captured.

Preferably, bands of reference axes may be used for identifying the characteristic reference points in the actual image. Ideally, if the magnification values are altered, the reference points in the image that belong to the respective magnification values are located on a reference axis associated with the reference points. A reference axis is defined by the geometric centre of the image and the characteristic reference points of the calibrating mode.

In reality, however, the reference points belonging to different magnification values are not located on a precisely one-dimensional reference axis but on a band of reference axes.

By restricting the search for the actual reference points in the actual image to the band of reference axes, the computing power (e.g. of a computer) that is needed to identify the characteristic reference points in the actual image can be greatly reduced. The time taken to determine the second magnification value can thus also be greatly reduced. Moreover, the risk of a possible misinterpretation and false detection of the characteristic reference points in the actual image can be substantially reduced in this way.

Preferably, the width of the band of reference axes can be determined by the distance of the optical axis of the microscope apparatus from the geometric centre of the image. In reality, the change in the positions of the reference points in the image as a result of the change in the magnification value is not exactly paracentric, i.e. not exactly symmetrical to the centre of the image. Moreover, in reality, the optical axis of the microscope apparatus does not exactly coincide with the centre of the image. These differences between a real microscope and an ideal one are the reason for the scattering of a reference axis to form a band of reference axes.

Advantageously, in the measuring mode, it is possible to distinguish whether the magnification value of the magnification system has changed or whether the magnification value has remained constant and the actual position of the object in the microscope apparatus has changed. If the reference features in the image are no longer visible after a change in the actual position of the object, the calibration mode has to be implemented again. If, however, the reference features are still visible in the image, the characteristic reference points determined in the calibrating mode and the reference distance determined can continue to be used.

As a result of the change in the actual position of the object while the magnification value remains constant, the position of the reference features and the position of the reference points in the image also change. These new positions of the reference features and the reference points in the image are generally obtained by rotation about a centre of rotation and by displacement. The reference distance before the change in the actual position of the object and the reference distance after this change are quantitatively the same. By comparing the reference distances before and after the change in the positions of the reference features and the reference points, it is possible to distinguish between a change in the actual position of the object and a change in the magnification value of the magnification system.

In a particularly advantageous embodiment of the invention, the user can be informed by a status notification of the current mode, i.e. the calibrating mode or measuring mode, of the microscope apparatus. The status notification may be embodied for example as a colour marking on the image, as an indicator element on a software user interface or as an acoustic notification.

It is particularly advantageous if the reference magnification is the maximum magnification value of the magnification system. As a result, the smallest possible object field is imaged in the detector device. This ensures that every particular reference feature and every characteristic reference point is also present in the images at all the other possible magnification values.

Further features and advantages of the invention will become apparent from the description and the attached drawings.

It will be understood that the features mentioned above and those still to be explained hereinafter may be used not only in the particular combination specified but also in other combinations or on their own, without departing from the scope of the present invention.

The invention is schematically represented by an embodiment by way of example shown in the drawings and is hereinafter described in detail with reference to the drawings.

BRIEF DESCRIPTION OF THE DRAWING VIEWS

Figure 2:
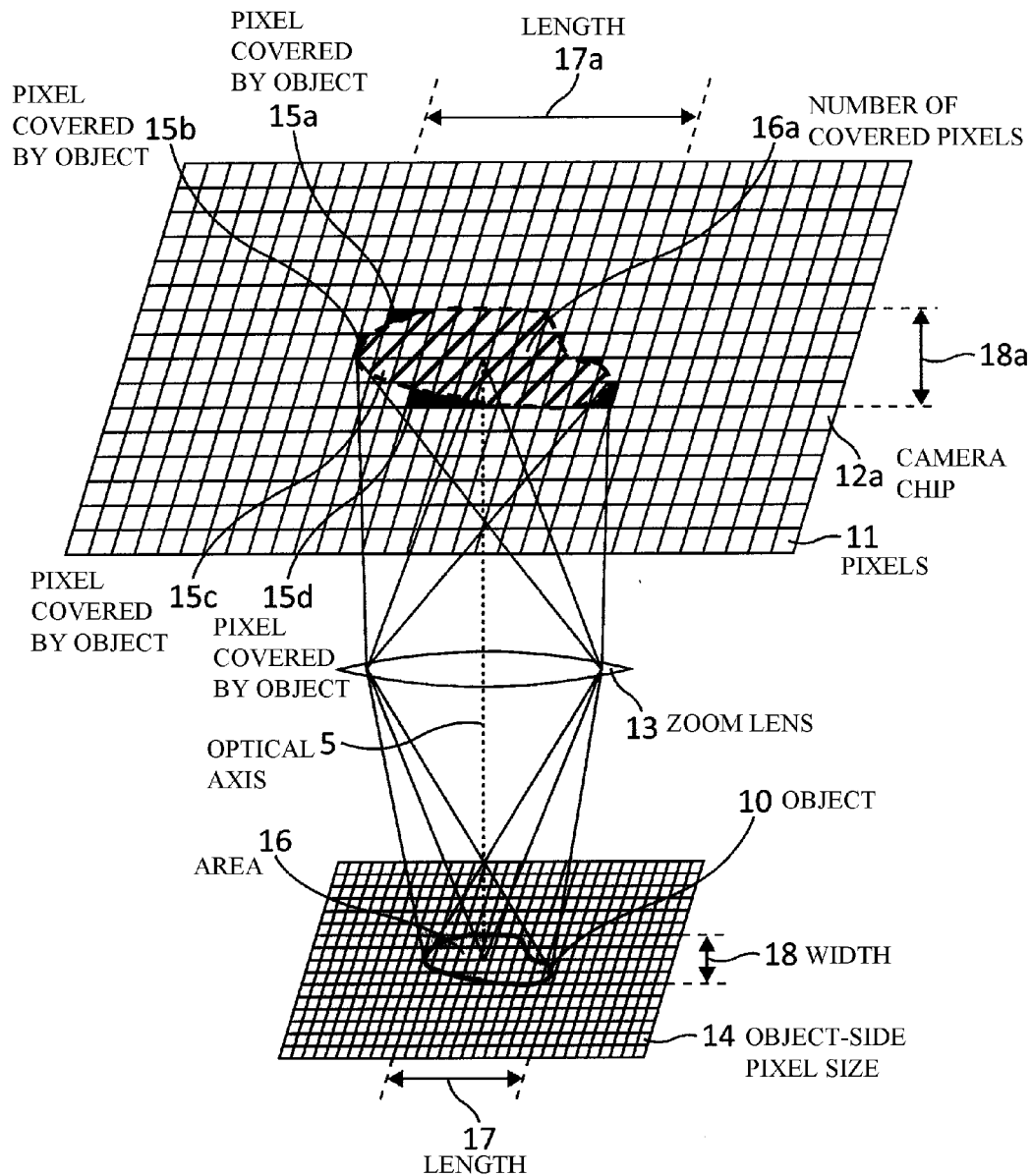
Figure 3:
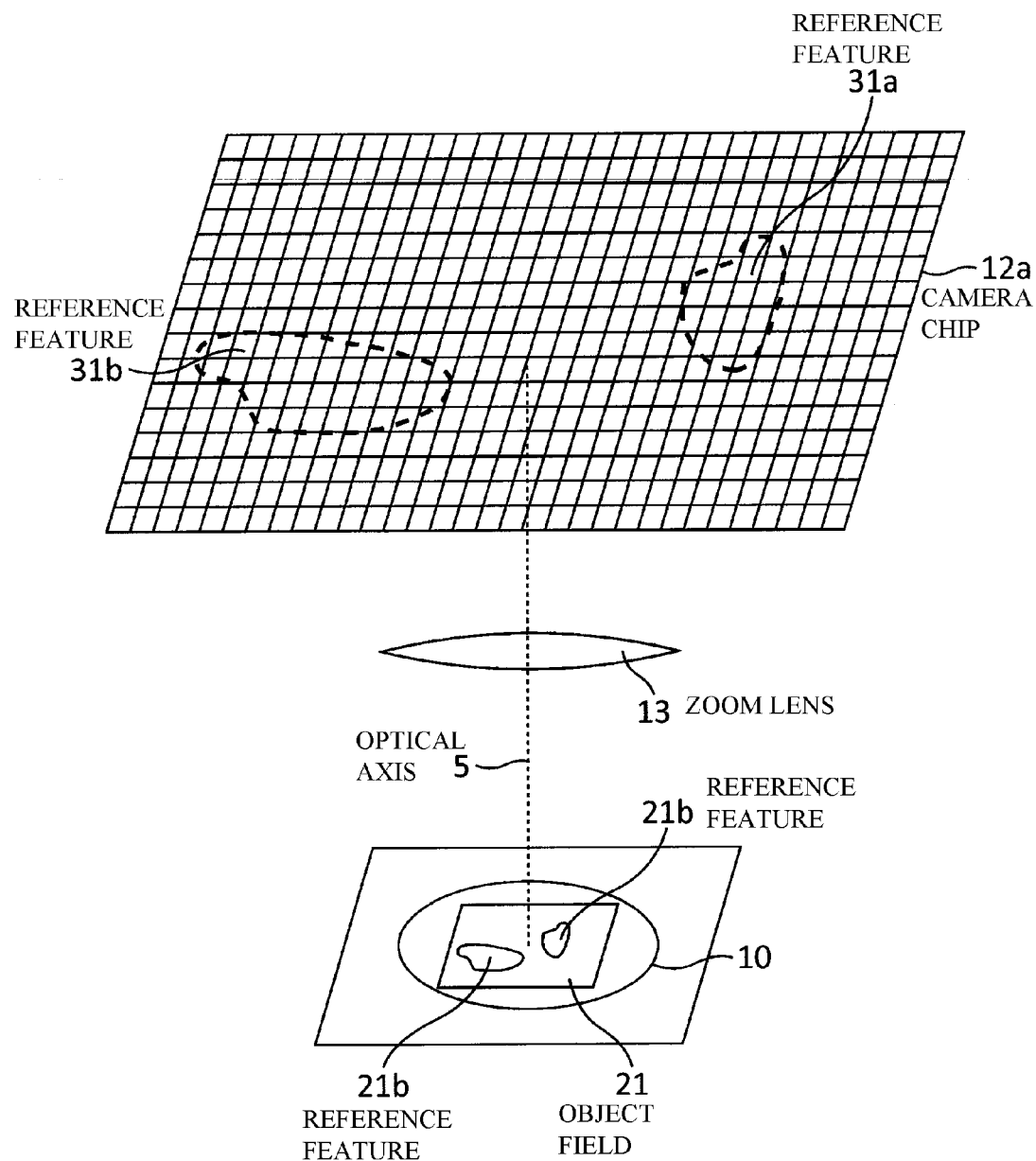

FIG. 1 schematically shows a microscope apparatus which is suitable for carrying out a preferred embodiment of a method according to the invention;

FIG. 2 schematically shows regions of a microscope apparatus by means of which the determination of the size of an object in the course of a preferred embodiment of a method according to the invention is described;

FIG. 3 schematically shows regions of a microscope apparatus by means of which a calibrating mode in the course of a preferred embodiment of a method according to the invention is described; and FIGS. 4 to 7 schematically show images such as may be captured in the course of a preferred embodiment of a method according to the invention;

DETAILED DESCRIPTION OF THE INVENTION

In FIGS. 1 to 7, identical elements have been given identical reference numerals.

FIG. 1 schematically shows a microscope apparatus 1 which is suitable for performing a preferred embodiment of a method according to the invention. An object 10 is illuminated by a light source 2. The microscope apparatus comprises an objective 13a and a zoom lens device 13. The magnification system which allows variable magnification has a zoom lens device 13 in this embodiment. The light that shines through the object 10 first strikes the objective 13a and then the zoom lens device 13. By the use of suitable lenses (not shown) the light is focused onto a detector device 12. Reference numeral 5 denotes the optical axis of the microscope apparatus 1. The detector unit is configured as a CCD camera 12. The CCD camera 12 is connected to a computer 3. The computer 3 evaluates the images that are captured by the CCD camera 12. Software is run on the computer, performing a preferred embodiment of a method according to the invention. By means of a display screen 4 connected to the computer 3, the user can view the images captured by the CCD camera 12.

By reference to the regions of a microscope apparatus schematically shown in FIG. 2, the determination of the size of the object 10 in the course of a preferred embodiment of a method according to the invention will be described hereinafter.

The object 10 is imaged on a CCD chip 12a of the CCD camera 12 by the zoom lens device 13. The pixel size of a pixel 11 of the CCD chip 12a is known or can be determined. The software determines an object-side pixel size 14 by dividing the size of a pixel 11 by the current magnification value of the zoom lens device 13.

For example, an object-side pixel area can be determined by dividing the area of a pixel 11 by the current magnification value of the zoom lens device 13.

An object-side pixel length can be determined by dividing the length of a pixel 11 by the current magnification value of the zoom lens device 13. An object-side pixel width can be determined by dividing the width of a pixel 11 by the current magnification value of the zoom lens device 13.

At the magnification value currently selected for the zoom lens device 13, the imaged object covers a number 16a of pixels 11 on the CCD chip 12a and hence in the image captured.

The number 16a of all the pixels 11 that are covered by the object 10 on the CCD chip 12a is determined. The reference numerals 15a, 15b, 15c, 15d for example indicate four of the pixels 11 that are covered by the object 10 on the CCD chip 12a.

The actual size of the object 10 may be determined in the form of an area 16, a length 17 or a width 18 of the object 10. In order to determine the area 16 of the object 10 as the size of the object 10, the number 16a of all the pixels 11 that are covered by the object 10 on the CCD chip 12a is multiplied by the object-side pixel area as the object-side pixel size 14.

To determine the length 17 of the object 10 as the size of the object 10, the number 17 of all the pixels 11 that are covered along the longitudinal extent of the object 10 on the CCD chip 12a is multiplied by the object-side pixel length as the object-side pixel size 14.

To determine the width 18 of the object 10 as the size of the object 10, the number 18 of all the pixels 11 that are covered along the widthways extent of the object 10 on the CCD chip 12a is multiplied by the object-side pixel width as the object-side pixel size 14.

Figure 4:
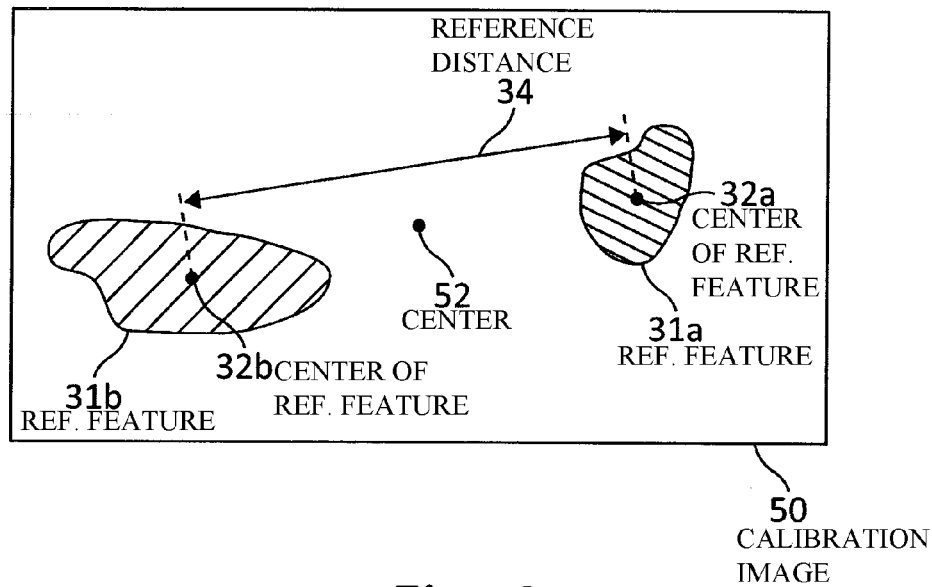

By reference to the regions of a microscope apparatus 1 that are schematically shown in FIGS. 3 and 4, a calibrating mode within the scope of a preferred embodiment of a method according to the invention will now be described.

The object 10 is imaged on the CCD chip at the maximum magnification value as the reference magnification value of the zoom lens device 13. The use of the maximum magnification value as the reference magnification value for the zoom lens device 13 ensures that the smallest possible object field 21 is used for the calibrating mode.

In the Figure, two reference features 31a and 31b are determined, which have a clear form and a sharp contrast. The reference features 31a and 31b are the images of respective reference features 21a and 21b of the object 10.

The choice of the maximum reference value ensures that each reference feature 21a and 21b of the object 10 is imaged even at different magnification values of the magnification system 13 on the CCD chip 12a.

FIGS. 4 to 7 schematically show images such as may be captured in the course of a preferred embodiment of a method according to the invention by a detector unit. The reference numeral 52 denotes the geometric centre of the images.

FIG. 4 shows a possible image 50 during the calibration mode, which has been captured at a reference magnification value. The software determines the centres of area 32a and 32b of the respective reference features 31a and 31b of the image as characteristic reference points. The distance 34 between the reference points 32a and 32b is determined as the reference distance 34.

A quotient of the reference magnification and the reference distance 34 is determined by the software as the correlation between the reference distance 34 and the reference magnification value. The calibrating mode is thus ended.

Figure 5:
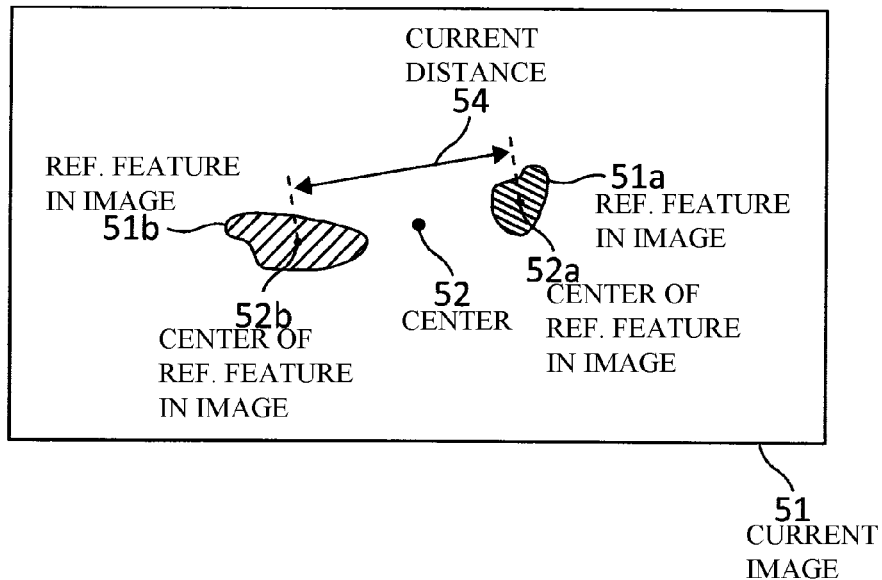

FIG. 5 shows a possible image 41 during the measuring mode. The image 51 is captured with a second magnification value which is smaller than the reference magnification value. As a result of the change in the magnification value the positions of the reference features 51a and 51b have moved relative to the centre 52 by comparison with the reference features 31a and 31b of the calibrating mode.

Thus, the characteristic reference points 52a and 52b have also moved relative to the centre 52 by comparison with the characteristic reference points 32a and 32b of the calibrating mode. The software identifies the reference features 51a and 51b in the image 51. The centres of area 52a and 52b of the reference features 51a and 51b in the image 51 are determined as characteristic reference points in the current image 51. The current distance 54 between the centres of area 52a and 52b is determined.

The software then determines the second magnification value by means of the correlation determined in the calibrating mode by multiplying the distance 54 by the quotient of the reference magnification and the reference distance 34.

This measuring mode is permanently repeated by the software. The software continuously determines the current magnification value from the current distance 54 and the correlation of the calibrating mode. The magnification value determined is output by the software using the user interface and can be read off the display screen 4 by the user at any time. As soon as the user manually adjusts the magnification of the zoom lens device 13, he can read off the newly set magnification value.

Advantageously, further embodiments of a method according to the invention can now be implemented using the software.

The software can determine the current object-side pixel size by dividing the pixel size of a pixel 11 of the CCD chip 12a by the second magnification value determined. With this current object-side pixel size 14 the software can determine, analogously to FIG. 3, the actual size of the complete object 10 or the actual size of the individual reference features 21a and 21b of the object 10 in the form of the area 16, the length 17 or the width 18 of the object 10 or the individual reference features 21a and 21b.

The user can also mark a region of the image by means of the user interface on the display screen 4. The software then determines the actual size of the marked region. For this marking the user may select tools in the form of geometric shapes such as lines, rectangles, circles or ellipses. The user may also define a polygon for himself. Moreover, the user may "draw" any desired shape in the image using the mouse cursor. The software can then determine the area of this shape as the size of the object 10, for example.

Figure 6A:
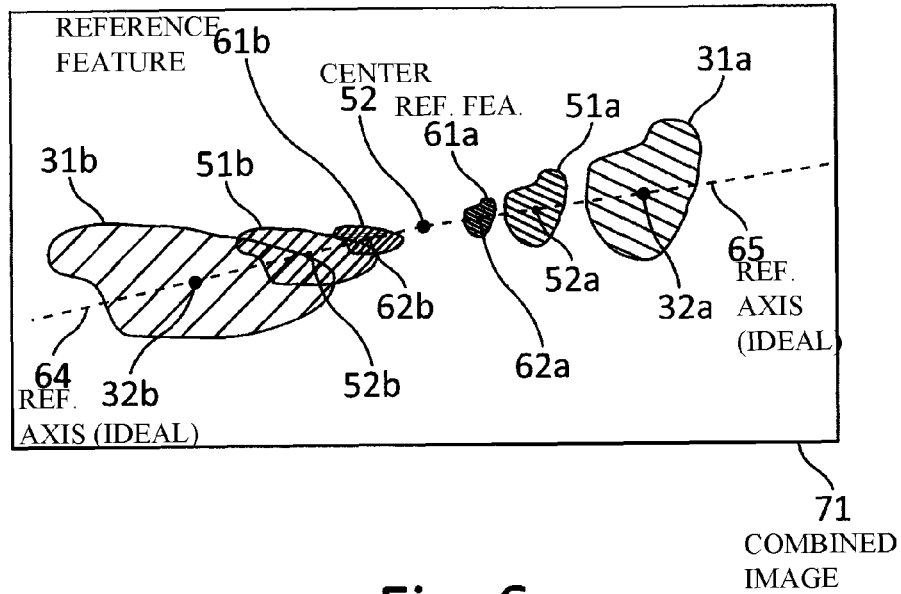
Figure 6B:
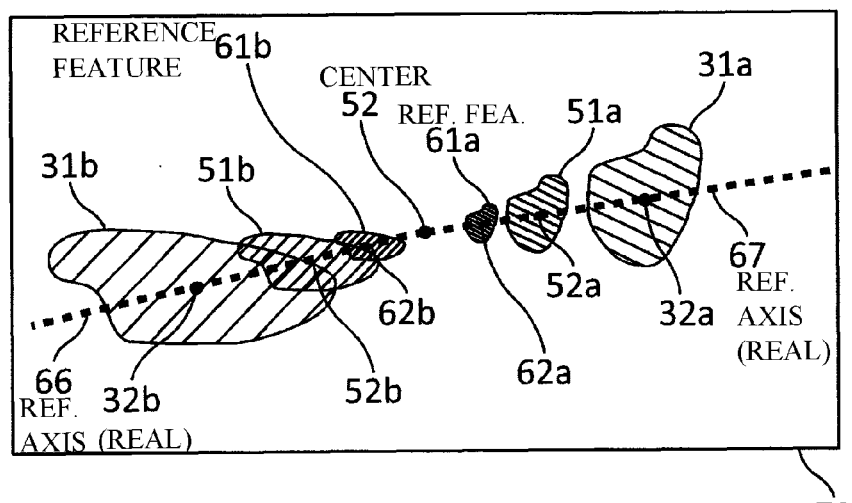

FIGS. 6a and 6b schematically show two images 71 and 72 by means of which the identification of the characteristic reference points is explained by bands 66 and 67 of reference axes 64 and 65.

In FIG. 6a three images with different magnification values are superimposed to form a combined image 71.

On the one hand, the image 71 comprises the image 50 that was captured during the calibration mode. The reference features and characteristic reference points 31a, 31b, 32a and 32b belonging to the image 50 can be seen in image 71.

On the other hand, the image 71 comprises the image 51 that was captured during the measuring mode. Analogously the reference features and characteristic reference points 51a, 31b, 52a and 52b belonging to the image 51 can be seen.

Moreover, the image 71 comprises reference features 61a and 61b and characteristic reference points 62a and 62b which relate to a further image in the measuring mode. This further image in the measuring mode was captured at a third magnification value which is smaller than the second magnification value.

As can be seen in image 71, the reference points 32a, 52a and 62a belonging to the reference features 31a, 51a and 61a are ideally located on a reference axis 65. The reference axis 65 is defined by the geometric centre 52 of the images and by the reference point 32a of the calibrating mode.

Analogously, the reference points 32b, 52b and 62b of the reference features 31b, 51b and 61b are ideally located on a reference axis 64. The reference axis 64 is defined by the geometric centre 52 of the images and by the reference point 32b of the calibrating mode.

FIG. 6b shows an image 72, analogous to FIG. 71, as captured with a real microscope apparatus. The reference axes 64 and 65 are scattered to form a band of reference axes 66 and 67.

In real microscope apparatus, the changes in the positions of the reference points 32b, 52b and 62b as a result of the change in the magnification value are not exactly paracentric, i.e. not exactly symmetrical to the centre 52 of the images.

Moreover, in real microscope apparatus, the optical axis 5 of the microscope apparatus does not coincide exactly with the centre 52 of the image. The reference axes 64 and 65 of an ideal microscope apparatus are thus scattered in a real microscope apparatus to form bands of reference axes 66 and 67.

Figure 7:
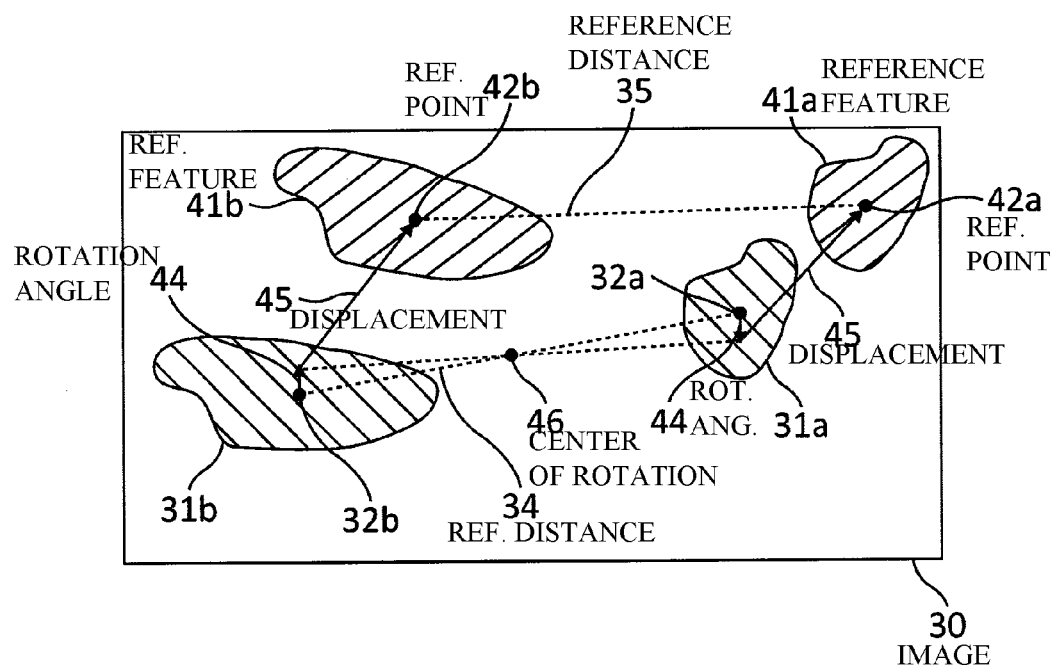

FIG. 7 schematically shows an image 30 by means of which the determination of a change in the actual position of the object 10 in the microscope apparatus 1 is explained.

If the actual position of the object 10 in the microscope apparatus 1 changes while the magnification value of the zoom lens device 13 remains constant, the positions of the reference features 31a and 31b and the characteristic reference points 32a and 32b in the image 30 also change.

The image 30 shows the positions of the reference features 31a and 31b and the characteristic reference points 32a and 32b at the reference magnification value. Moreover, the image 30 shows positions of the reference features 41a and 41b and the characteristic reference points 42a and 42b, as they might be captured with a change in the actual position of the object 10 in the microscope apparatus, but still at the same reference magnification value as before.

If the software detects the new positions of the reference features 41a and 41b and the new positions of the characteristic reference points 42a and 42b in the image 30, the software determines a rotation and a displacement which leads to the change in the position of the reference features 41a and 41b and in the characteristic reference points 42a and 42b in the image 30.

The software first of all determines a centre of rotation 46 about which the reference distance 34 has been rotated prior to the change in position of the object 10 compared with the reference distance 35 of the change in position of the object 10. Moreover the software determines the angle of this rotation, indicated by the reference numeral 44. Finally, the software determines a displacement 45.

What is claimed is:

1. A method for calibrating and using a microscope apparatus (1), wherein the microscope apparatus (1) comprises an optical magnification system (13) allowing variable magnification, a computer (3), and a detector device (12), whereby images of an object (10) are captured by means of the detector device (12) at different values of magnification of the optical magnification system (13), the method comprising the steps of:
A) at a first point in time, performing steps in a calibrating mode, the calibrating mode including the steps of:
capturing an image (50) of the object (10) by means of the detector device (12) at a known reference magnification value of the optical magnification system (13), wherein the object (10) does not include a reference scale or reference grid;
automatically by the computer (3) determining two characteristic reference points (32a, 32b) in the image (50);
automatically by the computer (3) determining a distance between the two characteristic reference points (32a, 32b) in the image (50) as a reference distance (34); and
automatically by the computer (3) determining a correlation between the reference distance (34) and the reference magnification value;
B) later, at a second point in time after the first point in time, implementing a measuring mode, the measuring mode including the steps of:
capturing a current image (51) of the object (10) by means of the detector device (12) at a second magnification value of the optical magnification system (13);
automatically by the computer (3) identifying the two characteristic reference points in the current image (52a, 52b),
automatically by the computer (3) determining a current distance (54) between the two characteristic reference points (52a, 52b) in the current image (51); and
automatically by the computer (3) determining the second magnification value from the current distance (54) based on the correlation between the reference distance (34) and the reference magnification value.

2. The method according to claim 1, wherein a size of the object is determined in the measuring mode.

3. The method according to claim 2, wherein an area (16), a length (17), a width (18), a circumference or another geometric feature of the object (10) is determined as the size of the object (10).

4. The method according to claim 2, wherein an object-side pixel size (14) is determined from the reference magnification value and a pixel size (11) of the detector.

5. The method according to claim 2, wherein an object-side pixel size (14) is determined from the second magnification value and a pixel size (11) of the detector.

6. The method according to claim 4, wherein the size (10) of the object is determined from the object-side pixel size (14) and the number (16a) of pixels that the object (10) covers in the image (50).

7. The method according to claim 5, wherein the size (10) of the object is determined from the object-side pixel size (14) and the number (16a) of pixels that the object (10) covers in the current image (51).

8. The method according to claim 1, wherein bands (66, 67) of reference axes (64, 65) are used for identifying the characteristic reference points (52a, 52b) in the current image (51), the reference axes (64, 65) being defined by a geometric center (52) of the image (51) and the characteristic reference points (32a, 32b) of the calibrating mode.

9. The method according to claim 8, wherein a width of a band (66, 67) of the reference axes (64, 65) is determined by a distance of an optical axis of the microscope apparatus from the geometric center (52) of the image.

10. The method according to claim 1, wherein the measuring mode further includes the step of determining whether an actual position of the object (10) in the microscope apparatus (1) has changed or whether the magnification value of the magnification system (13) has changed.

11. The method according to claim 1, further comprising the step of issuing a status notification indicating whether the microscope apparatus (1) is operating in the calibrating mode or in the measuring mode.

12. The method according to claim 1, wherein the reference magnification value is a maximum magnification value of the optical magnification system (13).

13. A computer unit (3) including a non-transitory computer-readable storage medium having a computer program stored thereon, wherein the computer program is executable to carry out the method according to claim 1.

14. A non-transitory computer-readable storage medium having a computer program stored thereon, the computer program comprising executable instructions for causing a computer unit to carry out the method according to claim 1.

* * * * *